Patented July 26, 1927.

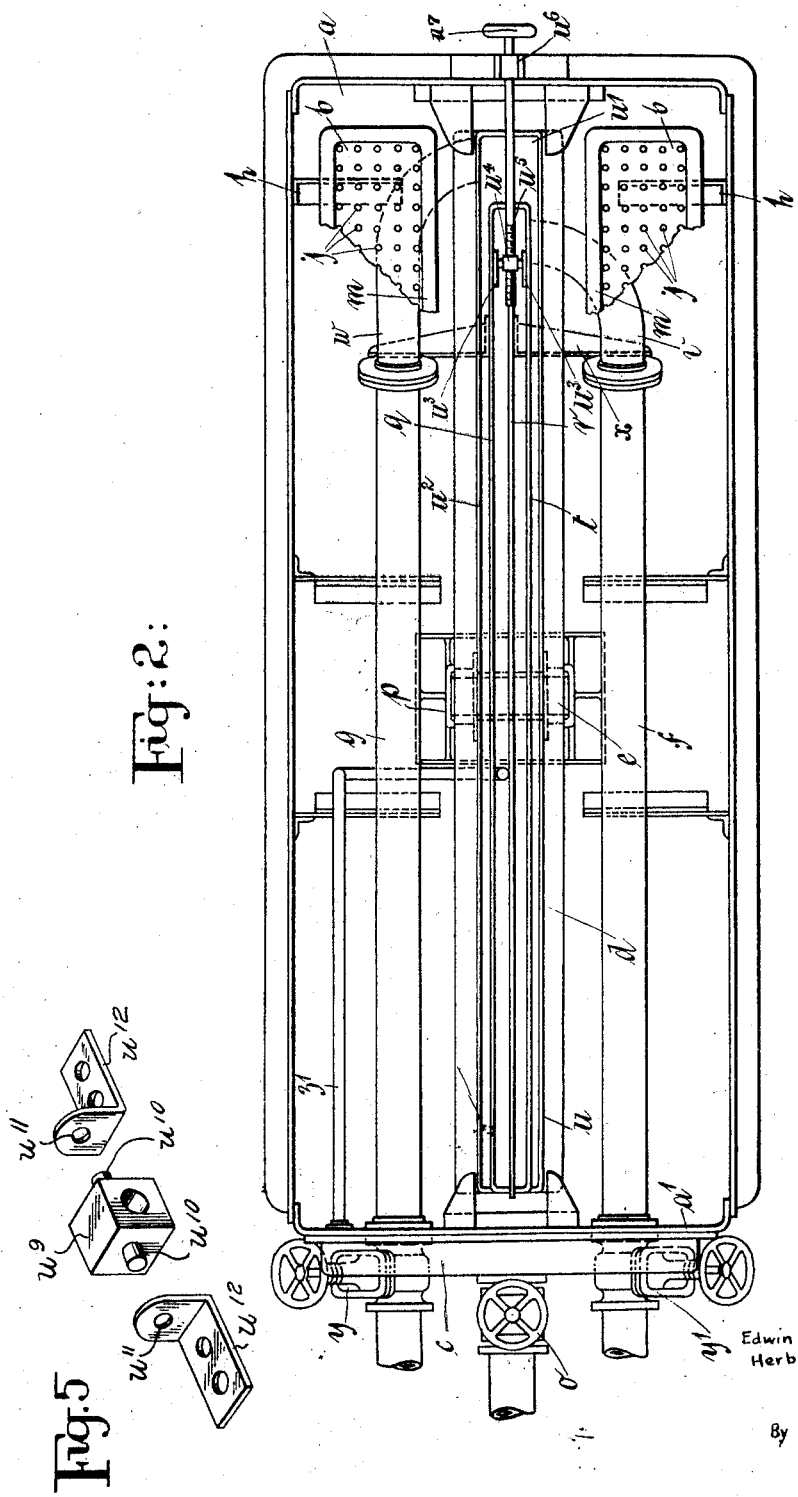

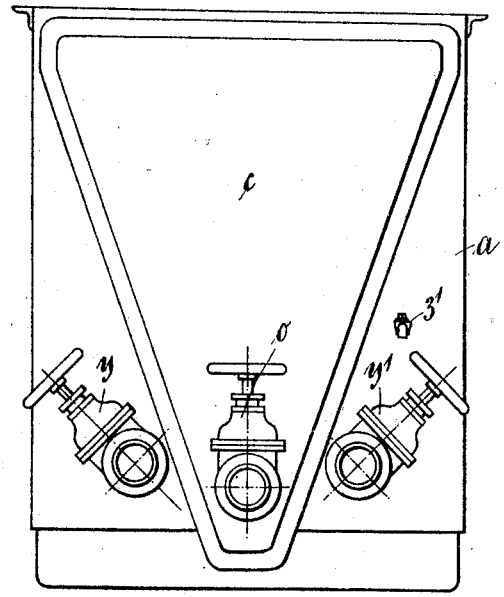
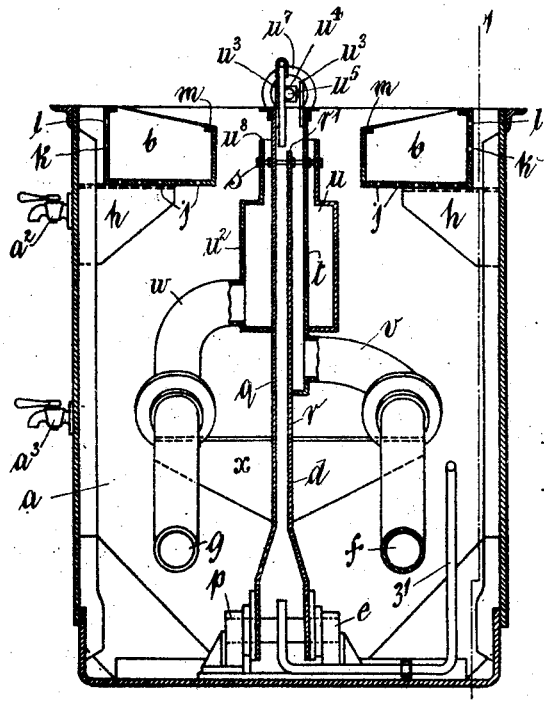

1,636,815

UNITED STATES PATENT OFFICE.

EDWARD WILLIAM GREEN, OF LONDON, AND HERBERT OGDEN, OF WESTCLIFF-ON-SEA, ENGLAND.

APPARATUS FOR SEPARATING FUEL AND OTHER OILS FROM WATER CONTAMINATED THEREWITH.

Application filed August 14, 1925, Serial No. 50,204, and in Great Britain August 26, 1924.

This invention relates to improvements in apparatus for separating immiscible liquids such as fuel oil and water which occurs for example in the form of ballast water from the fuel oil tanks on board ship and has for one of its objects the provision of means whereby the required separation can be more simply, reliably and readily effected than has been possible heretofore; a further object being the arrangement of parts and means whereby the apparatus when installed on board ship can be easily adjusted to enable efficient separating operation to be obtained without reducing the rate of flow through the apparatus regardless of the list or trim of said ship.

The invention consists in an improved apparatus for separating immiscible liquids such as fuel oil and water from one another and comprises a tank, a channel or channels arranged in the upper part of said tank, said channel or channels in which the said liquids tend to stratify being adapted to receive the admixed liquids for separation, perforations in the floor of each of said channels for permitting the liquid having the greater specific gravity to pass downwardly under the action of gravity, a series of perforations in a side wall of each of said channels for permitting the liquid having a less specific gravity to pass out from said channel on to the upper surface of the liquids in the tank, a discharge weir for the liquid having the greater specific gravity, a conduit delivering liquid to said weir from the lower part of said tank, a conduit for receiving such liquid and conducting it to the exterior of the tank, a discharge weir for the liquid having the less specific gravity and a conduit for receiving the discharge from the last named weir and conducting it to the exterior of the tank, the weirs in some cases being arranged in proximity to and parallel with one another as a structure which can be angularly displaced relatively to the tank.

In the drawings:—

Figure 1 is a longitudinal section through one form of apparatus constructed in accordance with this invention, the section being taken on the line 1—1 of Figure 4 hereinafter referred to.

Figure 2 is a plan view of the apparatus illustrated in Figure 1.

Figure 3 is an end elevation of the apparatus illustrated in Figures 1 and 2 looking in the direction of the arrow 3, and Figure 4 is a transverse section of the apparatus illustrated in the preceding figures, the section being taken on line 4—4 of Figure 1.

Figure 5 is a detail view of the parts forming the swivelling bearing.

The apparatus illustrated in the drawings is particularly suited for separating the fuel oil from ballast water and comprises a tank $a$, longitudinally arranged channels $b\ b$, a feed distributing device $c$, a weir structure $d$ pivoted at $e$ anl flexible delivery pipes $f$ and $g$ for the water and oil respectively.

The tank $a$ is of more or less ordinary form and construction and is provided with the necessary stiffeners and gussets to enable a satisfactory structure to be made; the tank sides carry the necessary brackets $h\ h$ for supporting the channels $b\ b$ in position, and the top edge of the tank has the means for angularly adjusting the weir structure $d$ mounted thereon.

The channels $b\ b$ are each provided with a plurality of perforations $j$ in the bottom thereof and with two series of slots or perforations $k$ and $l$ in the sides disposed in proximity to the wall of the tank $a$. The lower series of perforations $k$ are for operation when the apparatus is operating with a normal feed whilst the upper series $l$ is available for use should the apparatus be slightly surcharged with a viscous oil or tilted transversely. In the event of the channels $b\ b$ being seriously surcharged then relief is obtained by the fluid in the said channels $b\ b$ flowing over the sides $m\ m$, the upper edges of which are suitably located to enable this to be effected without unduly disturbing the proper action of the apparatus or spilling the fluids.

The channels $b\ b$ are supplied by a feed distributing device $c$ which is mounted upon one end of the tank $a$ and is for reasons of economy of space and maintenance of efficiency of operation of inverted triangular shape. The upper part of the end of the tank $a$ upon which the device $c$ is mounted has two apertures $n\ n$ therein suitably disposed relative to the channels $b\ b$ for delivery of fluid thereto, the lower edge of said apertures $n$ $n$ being located above the floor of the channels $b$ $b$ so as to form delivery weirs over which the fluid passes on its way from the device $c$ to the channels $b$ $b$. The device $c$ is supplied with fluid through the valve $o$ which is situated in close proximity with the apex of the inverted triangle.

A cradle $p$ is mounted upon the floor of the tank $a$ and receives and supports the trunnion $e$ of the weir structure $d$.

The weir structure $d$ comprises two plates $q$ and $r$ connected at their ends and maintained in spaced relation by distance pieces $s$; the lower edges of the plates $q$ and $r$ are separated by a greater distance than that which separates the remainder of the said plates whilst the upper edge $r'$ of the plate $r$ is located below the upper edge of the plate $q$. The trunnion $e$ is disposed at the lower part of the plates $q$ and $r$ and is secured in position by any suitable mechanical means. A plate $t$ mounted on the plate $r$, is of less depth than the said plate $r$ to which is connected at the sides and lower edge, the upper edge of the said plate $t$ being level with the upper edge of the plate $q$, the plate $t$ being also maintained in spaced relation with the plate $r$ by spacers $s$.

The plates $q$ $r$ and $t$ are arranged within an open topped chamber $u$ and pass through the bottom of said chamber. The chamber $u$ is of greater length than the length of the plates $q$ $r$ and $t$ in order that the part $u'$ of the said chamber $u$ shall communicate with the remainder.

The wall $u^2$ of the chamber $u$ and the plate $t$ are provided with elbows $v$ and $w$ respectively, said elbows being supported at their free ends by brackets $x$. The free ends of the elbows $v$ and $w$ are connected to the wall $a'$ of the tank $a$ by means of the flexible pipes $g$ and $f$ respectively, the wall $u^2$, the plate $t$ and the wall $a'$ being suitably perforated in order that the chamber $u$ and the space between the plates $r$ and $t$ may communicate with the exterior of the tank $a$. To control the flow through the pipes $f$ and $g$ valves $y$ and $y'$ are provided.

In order that the stratum of oil can be discharged when necessary a valve controlled service pipe $z$ is suitably arranged as shown to deliver water to the space between the plates $q$ and $r$ and to partially drain the tank $a$ a valve controlled service $z'$ is also provided.

To angularly displace the weir structure and maintain it in an angularly displaced position the said structure is provided with two upstanding lugs $u^3$ having a nut $u^4$ which is pivoted for angular displacement of its axis. The nut $u^4$ is mounted on a screw $u^5$ rotatably supported in the swivelling bearing $u^6$ comprising a block $u^9$ having projections $u^{10}$ rotatably supported by the holes $u^{11}$ in the brackets $u^{12}$ (see Fig. 5) carried by the flange of the tank $a$. The screw $u^5$ is provided with a hand wheel $u^7$ to enable convenient rotation of said screw $u^5$ to be effected when it is necessary to adjust the weir structure to evenly distribute the flow of fluid over the upper edge $r'$ of the plate $r$ and the upper edge $u^8$ of the chamber $u$.

In operation the fluids to be separated, for example the ballast water from fuel oil tanks, is supplied to the device $c$ through the valve $o$. From the device $c$ the fluids pass over the lower edge of the apertures $n$ $n$ into the channels $b$ $b$. Assuming the tank $a$ to be filled with water or other fluid the fluids admitted to the channels $b$ $b$ stratify and the heavier fluid such for example as water passes through the perforations $j$, whilst the lighter fluid such as fuel oil for example passes through the lower series of perforations $k$ and forms an upper stratum of oil in the tank $a$. If the valves $y$ and $y'$ are open and sufficient fluid is present the heavier liquid is displaced upwards between the plates $q$ and $r$ and discharges over the upper edge $r'$ of the plate $r$ into the space between the plates $r$ and $t$ and from thence through the elbow $w$, flexible pipe $f$ and valve $y'$ to the exterior of the tank $a$ whilst the uppermost layer of oil discharges over the upper edge $u^8$ of the chamber $u$ into said chamber and from thence through the elbow $v$, flexible pipe $g$ and valve $y$ to the exterior of the tank $a$.

When the whole of the fluids to be separated have been passed into the tank $a$ and it is required to completely remove the lighter fluid such as oil, the valve $y'$ may be closed and heavier fluid such as water may be delivered to the space between the plates $q$ and $r$ from the service $z$ until the whole of the oil stratum is displaced over the edge $u^8$ of the chamber $u$.

A large proportion of the water contained in the tank $a$ can be discharged through the service $z'$ so that a convenient travelling level can be easily obtained.

It will be noticed that the upper edge $r'$ of the plate $r$ is slightly below the edge $u^8$ of the chamber $u$; this is to provide for the difference in effective hydrostatic head of the fluids due to the different specific gravities thereof.

When the apparatus is installed on a ship the longer dimension of the tank is placed as nearly parallel to the keel of the ship as possible in order that variations in trim may be compensated for by adjusting the weir structure by means of the hand wheel $u^7$ and provided the edges $r'$ and $u^8$ are in close proximity to one another no adjustment for list is required, but it must be understood that efficient separating operation of the apparatus is by no means dependent upon the close proximity of the edges $r'$ and $u^8$.

During operation or upon the completion of operation of the apparatus it is convenient to be able to ascertain the position of the interface of the strata and to enable this to be easily accomplished test cocks such as $a^2$ and $a^3$ may be fitted in a wall of the tank $a$.

Although no special reference has been made to cleaning facilities the tank $a$ may be fitted with such manholes as may be necessary and expedient.

We claim:—

1. An apparatus for separating immiscible liquids from one another comprising a tank, channels in which the liquids tend to stratify arranged in the upper part of said tank, said channels being adapted to receive the admixed liquids for separation, perforations in the floor of each of said channels for permitting the liquid having the greater specific gravity to pass downwardly under the action of gravity, a series of perforations in a side wall of each of said channels for permitting the liquid having a less specific gravity to pass out from said channels on to the upper surface of the liquids in the tank, a discharge weir for the liquid having the greater specific gravity, a conduit delivering such liquid to said weir from the lower part of said tank, a conduit for receiving the liquid from the weir and conducting it to the exterior of the tank, a discharge weir for the liquid having the less specific gravity and a conduit for receiving the liquid from the last named weir and conducting it to the exterior of the tank.

2. An apparatus for separating immiscible liquids from one another comprising a tank, stratification channels for receiving the admixed liquids, perforations in the floor of each channel for allowing the densest liquid to pass downwardly, perforations in a side wall of each channel for allowing the less dense liquid to pass laterally, a weir structure as an independent unit located in said tank and conduits for conveying the separating liquids discharged over the weirs to the exterior of the tank.

3. An apparatus for separating immiscible liquids from one another comprising a tank, stratification channels for receiving the admixed liquids, perforations in the floor of each channel for allowing the densest liquid to pass downwardly, perforations in a side wall of each channel for allowing the less dense liquid to pass laterally, a weir structure as an independent unit located in said tank, means for angularly displacing said structure in the vertical planes containing the weirs and relatively to the tank and flexible conduits for conveying the separated liquids discharged over the weirs to the exterior of the tank.

4. An apparatus for separating immiscible liquids from one another comprising a tank, stratification channels for receiving the admixed liquids, perforations in the floor of each channel for allowing the densest liquid to pass downwardly, perforations in a side wall of each channel for allowing the less dense liquid to pass laterally, a partition in said tank extending from the upper edge of the tank into proximity with the floor of the tank, a second partition in said tank in proximity with the first named partition and connected thereto by side walls the upper edge of said second partition being located so as to act as a weir for the denser liquid and the lower edge of said second partition being in proximity with the floor of the tank, a third partition in said tank extending from the upper edge of the tank downwardly and being connected to said second partition to form a chamber for receiving the discharge over the weir, a conduit for conveying the denser liquid from said chamber to the exterior of the tank, a chamber on the first and third named partitions having an upper edge for acting as a weir for the less dense liquid and a conduit for conveying the less dense liquid from the last named chamber to the exterior of the tank.

5. In an apparatus as claimed in claim 4 the arrangement of a trunnion in the tank for pivotally supporting the partitions, weirs and chambers as a structure and means for angularly displacing the structure in the vertical planes containing the weirs, the conduits from said chambers being flexible so as to permit of the displacement.

EDWARD WILLIAM GREEN.
HERBERT OGDEN.